(12) United States Patent
Dudai et al.

(10) Patent No.: US 6,821,078 B2
(45) Date of Patent: Nov. 23, 2004

(54) MOTOR VEHICLE CHAIR SYSTEM FOR PHYSICALLY DISABLED PERSONS

(75) Inventors: Simon Dudai, Miami Beach, FL (US); Raul Guim, Miami, FL (US)

(73) Assignee: Americhair Corporation, Sunny Isles Beach, FL (US)

( * ) Notice: Subject to any disclaimer, the term of this patent is extended or adjusted under 35 U.S.C. 154(b) by 31 days.

(21) Appl. No.: 10/302,744

(22) Filed: Nov. 21, 2002

(65) Prior Publication Data

US 2004/0101391 A1 May 27, 2004

(51) Int. Cl.[7] ................................................. B60P 1/44
(52) U.S. Cl. ...................... 414/546; 414/541; 296/65.1
(58) Field of Search ................................ 414/541, 542, 414/543, 546, 786, 921; 296/65.03, 65.04, 65.1; 280/242

(56) References Cited

U.S. PATENT DOCUMENTS

| | | | | |
|---|---|---|---|---|
| 4,121,695 A | * | 10/1978 | Carpenter | ................... 414/539 |
| 4,483,653 A | | 11/1984 | Waite | |
| 5,466,111 A | * | 11/1995 | Meyer | ........................ 414/462 |
| 5,524,960 A | * | 6/1996 | Townsend | ................... 296/155 |
| 5,630,638 A | * | 5/1997 | Hirasawa et al. | ........ 296/65.07 |
| 5,636,884 A | | 6/1997 | Ladetto et al. | |
| 5,746,465 A | | 5/1998 | Jones et al. | |
| 5,769,480 A | * | 6/1998 | Gebhardt | ................. 296/65.12 |
| 6,386,614 B1 | | 5/2002 | Logan | |
| 6,416,272 B1 | | 7/2002 | Suehiro et al. | |

FOREIGN PATENT DOCUMENTS

| | | | | |
|---|---|---|---|---|
| DE | 3813495 A1 | * 11/1989 | ............. B60P/1/46 |
| JP | 5-221259 | * 8/1993 | ............. B60P/1/46 |

* cited by examiner

Primary Examiner—Eileen D. Lillis
Assistant Examiner—Charles A. Fox
(74) Attorney, Agent, or Firm—McHale & Slavin PA

(57) ABSTRACT

A docking mechanism for mounting in a vehicle movably supports a separable chair. The docking mechanism has a turntable, fixed in the vehicle, carrying arms with an articulated lifting device to move the chair vertically and horizontally along the arms. In operation, the chair is maneuvered over the lifting device, outside the vehicle, and raised vertically then moved horizontally along the arms to a stowed position inside the vehicle. The chair has powered supporting wheels which are steerable and retractable for stowing. In this manner, an occupant of the chair may enter and exit a vehicle without leaving the chair.

12 Claims, 6 Drawing Sheets

MOTOR VEHICLE CHAIR SYSTEM FOR PHYSICALLY DISABLED PERSONS

BACKGROUND OF THE INVENTION

1. Field of the Invention

This invention relates to the field of mobile chairs to be used to transport the occupant across the ground and as a seat in a motor vehicle, as well as a comfortable stationary chair for sitting.

2. Background of the Invention

Those people who have lost the ability to stand and walk, either temporarily or permanently, usually wish to remain a part of active society and move about on their own terms. If their condition limits them to a sitting position, some type of wheelchair is necessary for independent movement. The motorized wheelchair reduces the physical effort for locomotion allowing a wider range of travel. This conventional wheel chair presents certain obstacles to freedom of movement, most notably, caused by an abrupt change in elevation of the surface over which the wheelchair is traveling. Of course, the problem of stair steps or building access has been addressed by legislative action. However, obstacles still remain in situations where the wheelchair must interact with other forms of transportation. This is especially true in relation to private vehicular transportation.

Further, the conventional wheelchair is not suited for regular seating in an automobile and this requires the user to change from the wheelchair to the car seat. Conversely, extensive modifications of an automobile must be completed before a conventional wheelchair can be used in a car. Each of these options has it's obvious drawbacks.

2. Description of the Prior Art

U.S. Pat. No. 6,416,272 issued to Suehiro et al discloses a wheelchair and lift mechanism to be used with an automobile. As shown, the automobile has a deeply recessed door sill, much like a van, with a lifting mechanism mounted at a substantially higher level inside the vehicle. The lifting mechanism has a movable base that slides toward the door sill. The lifting mechanism has arms that engage each side of the back of the chair and pivot upwardly to lift the chair to the level of the floor pan. As the chair is lifted, the wheels retract and rotate laterally to reduce the depth of the undercarriage to accommodate the chair so that it approximates a seat in the vehicle. The size of the lifting mechanism and the under-the-seat space occupied restricts the thickness of the seat because of the limited head room in the vehicle. The chair is drawn into the van by a worm gear or other mechanism mounted on the movable base of the lift mechanism. The chair is latched in the base and the base is rotated to face the chair forward in the vehicle.

Logan, U.S. Pat. No. 6,386,614, teaches the use of a ramp to provide access for a wheelchair into a mini-van. The wheelchair has an adjustable frame to accommodate the passenger and the head room in the interior of the van.

Another lifting mechanism and wheelchair is taught by Jones et al, U.S. Pat. No. 5,746,465, in which a user can move from a wheelchair located outside the vehicle to the driver's seat. In this arrangement, the driver's seat is mounted on a pivot post built into the car along the rear edge of the door opening. The seat is powered to pivot inwardly and outwardly about the pivot post and move vertically to adjust the car seat level with the wheelchair.

A turn table mounted on rails in the vehicle is disclosed in Ladetto et al, U.S. Pat. No. 5,636,884. The turn table rotates a vehicle seat from facing forward to facing the door to aid in getting in a van.

U.S. Pat. No. 4,483,653 to Waite discloses another chair and lift mechanism for loading a wheelchair into a vehicle. This system uses a door post for raising the wheelchair for entry into the auto. The wheels of the wheelchair are retracted into the sides of the seat in a converging orientation to reduce the footprint of the seat inside the vehicle.

All these conventional systems are very complicated, particularly in the lifting and landing gear-like devices, for stowing the wheelchair wheels. And the lifting mechanisms impinge on the design of the chair.

What is needed in the art is a mechanically elegant and comfortable chair, in the nature of a bucket seat found in some luxury automobiles, that may be occupied for long periods of time and used as a wheelchair or an automobile seat. An occupant of such a chair would not be forced to leave his/her seat for car travel or independent locomotion and other normal activities. Further, the chair requires a simple dock mounted in the auto, without extensive modification of the auto, for proper placement of the seat within the automobile.

SUMMARY OF THE PRESENT INVENTION

It is, accordingly, an object of the present invention to provide a chair and dock system for use in a passenger automobile in which the docking mechanism requires little modification to an existing automobile and the chair is quite similar to other seating in the car.

It is another object of the present invention to provide a very comfortable chair that is wheeled. The wheels are powered, preferably, though non-powered wheels may be used. The wheels are also retractable to reduce the height of the chair. The sitting position of the chair is adjustable by movement of the back and seat relative to each other. The wheelchair is in the nature of a luxury seat found in automobiles and airplanes.

It is a further object of the present invention to provide a rotating dock for supporting and securing the chair in the vehicle. The dock is adapted to be mounted on the floor pan of an automobile and will rotate at least 90 degrees from a normal seating orientation, relative to a car, to a side facing position.

It is yet another object of the present invention to provide a flexible drive system in the nature of a chain and sprocket system on the dock to move the chair relative to the dock.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

SHORT DESCRIPTION OF THE DRAWINGS

DETAILED DESCRIPTION OF THE INVENTION

Figure 1:
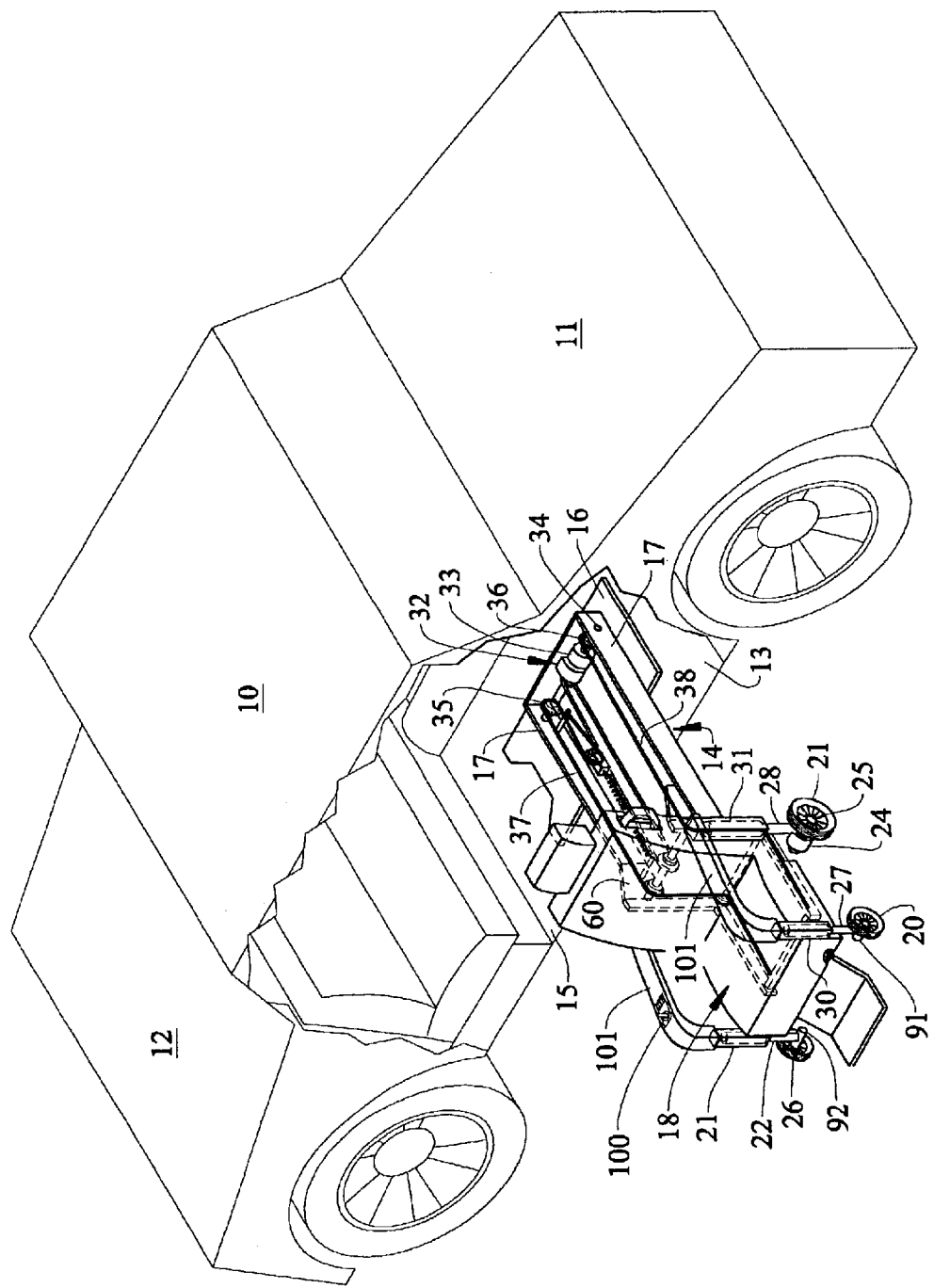
FIG. 1 is a partial cut-away of a perspective of an automobile with the chair and dock system of this invention.

In FIG. 1, the vehicle 10 has a front 11 and a rear 12. The vehicle may be any conventional style, including cars, vans, SUVs, and trucks. Because of differing body construction in conventional vehicles, the distance between the floor pan 13 and the bottom edge of the door opening is not the same in all vehicles. In the instant invention it is essential that the dock 14 clear the bottom edge of the vehicle door opening 15. The mounting plate 16 may be made in various thicknesses or shims may be added between the floor pan 13 and the mounting plate 16 to arrive at the correct height. As shown in FIG. 1, the arms 17 of the dock must be of sufficient length to extend through the door opening 15 and, at least, beyond the vehicle body to allow the chair to back onto the lift portion 19 on the dock. The mounting plate 16 should be mounted in the floor pan 13 so that the chair 18 may rotate from outside the vehicle through the door opening to a conventional seating arrangement as shown. Since the floor pan is designed to support passengers and their seats, no major alteration of the vehicle construction is contemplated for installing this system.

Figure 2:
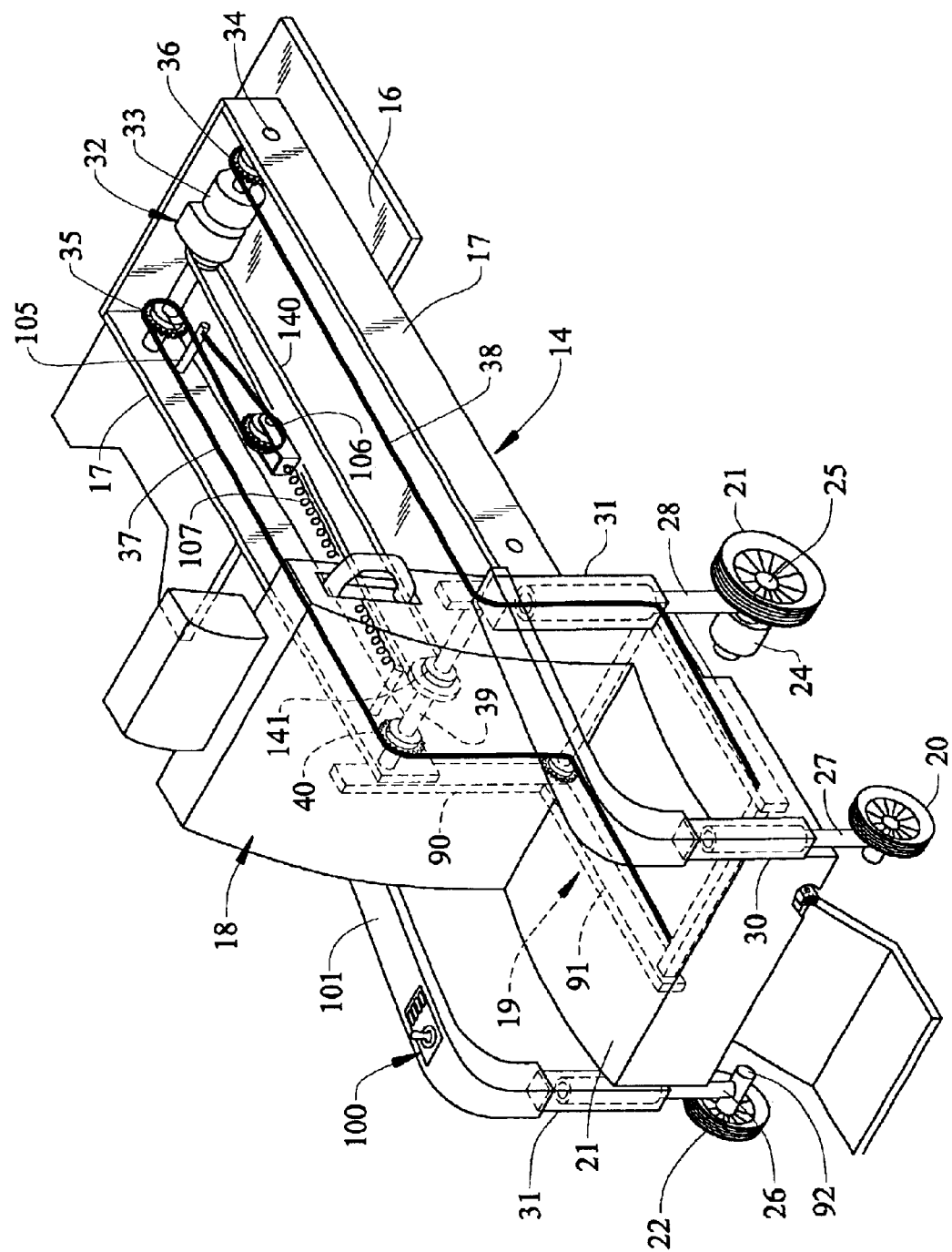
FIG. 2 is an enlarged perspective of the chair in FIG. 1.

As shown in FIGS. 1 and 2, the chair 18 is supported on four wheels, the wheels 20, 21, 22 and 23 are shown as located at the four corners of the chair. The set of wheels 20, 21 on the left side of the chair are duplicated on the right side. The rear wheels of the chair may be powered, as illustrated by motor 24 on wheel 21. Of course, the front wheels or all four wheels could be powered by different layouts and gearing using one, two or more motors. Wheel 21 is mounted by axle 25 on shaft 27. Each wheel is supported on an axle at the bottom of a vertical shaft 26, 27, and 28. The vertical shafts extend and retract into vertical pylons 29, 30, and 31 with the axles as a stop. The shafts and pylons may be integral portions of a jack or other hydraulic, mechanical or electrical lift device (not shown) to vertically extend and retract the wheels. The lift devices may be individually powered, powered by pairs or all four may be powered by one engine.

The front wheels 20 and 22 are steerable by rotating the shafts within the pylons. The steering may be accomplished by the controls 100 mounted on one of the arm rests, eg. a joystick or left and right buttons. The controls 100 also direct the raising and lowering of the wheels with up and down buttons or similar devices. The conveyor mechanism may also be commanded by the controls 100. The lifting mechanism and conveyor may also be operated from controls in the vehicle, if desired.

The dock 14 has a active conveyor mechanism 32 that cooperates with the lifting portion 19 to permit the occupant of the chair to enter and exit the vehicle without leaving the chair 18. The conveyor mechanism 32 has a motor 33 mounted on a shaft 34 between the interior ends of the arms 17. The shaft 34 carries drive wheels or sprockets 35, 36 at each end adjacent to each arm 17. The drive wheels move linked chains or flexible drive belts 37, 38 which extend parallel with the arms 17. Another shaft 39 connects the exterior ends of the arms 17 and includes rotary drive mechanisms or sprockets 40, 41 at each end of the shaft adjacent the exterior ends of the arms 17.

Figure 3:
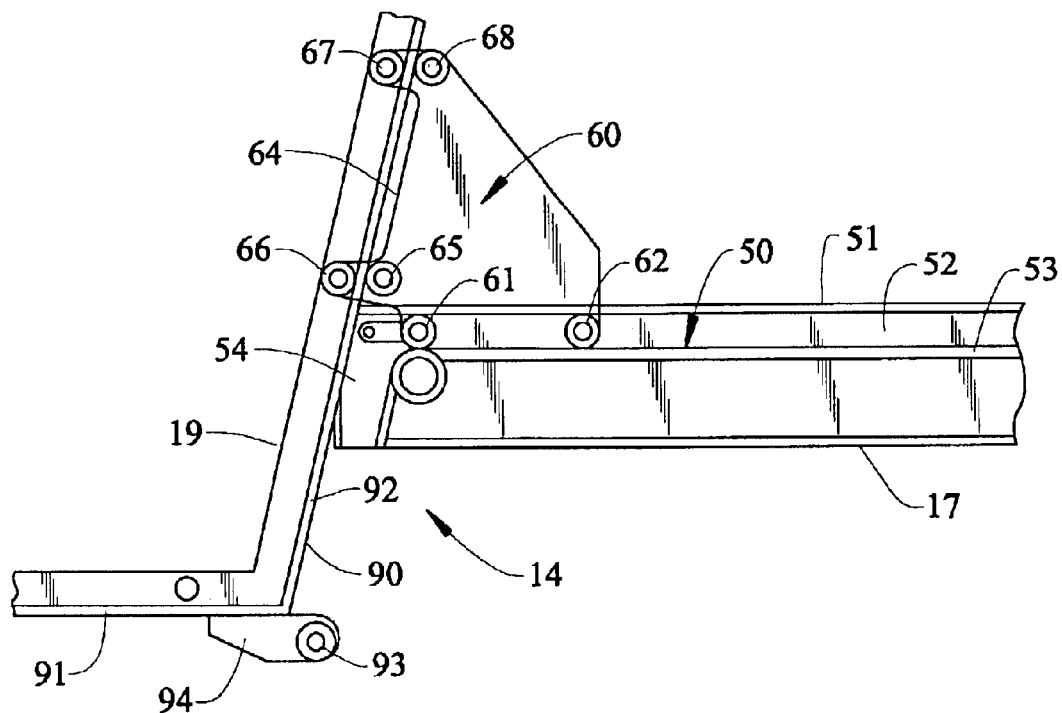
FIG. 3 is a detail side view of the docking mechanism and stabilizer brackets in the lowered position.
Figure 4:
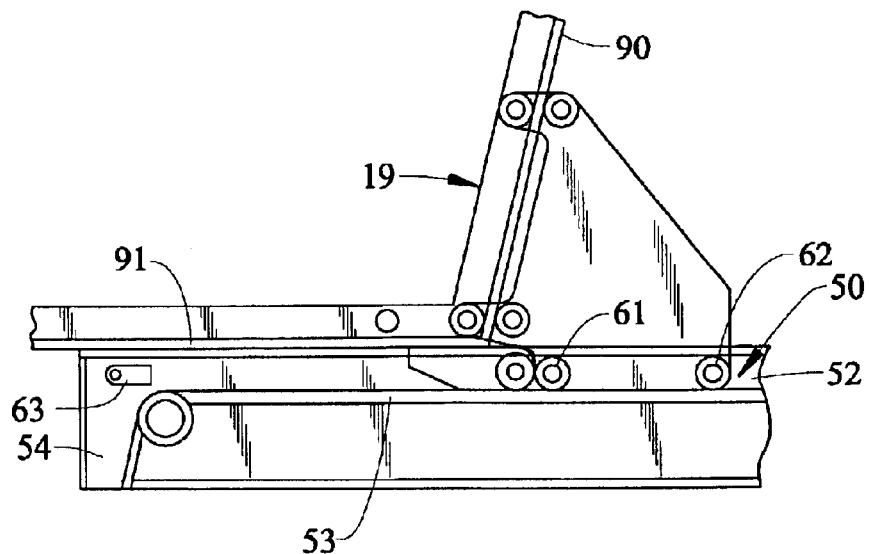
FIG. 4 is a detail side view of the docking mechanism and stabilizer brackets in the raised position.
Figure 5:
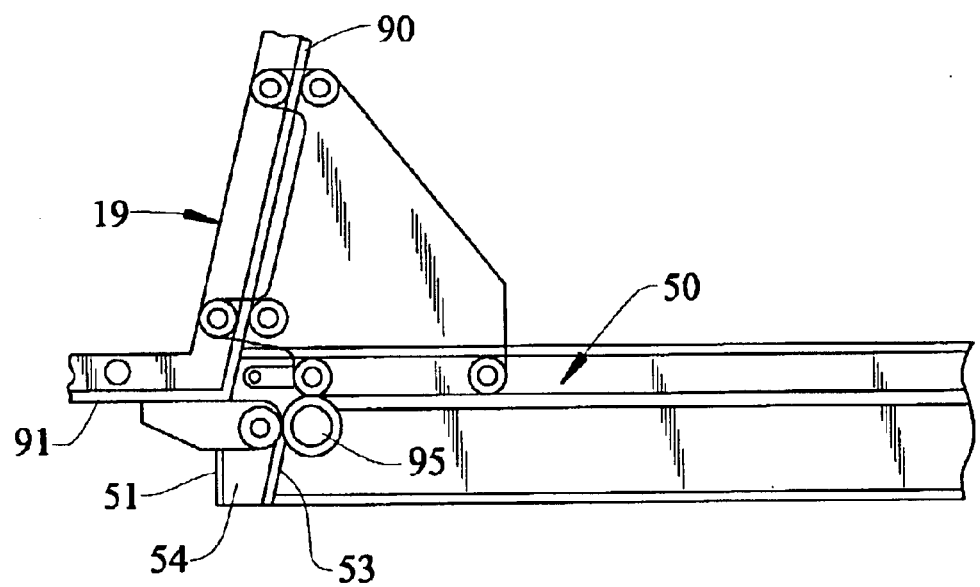
FIG. 5 is a detail side view of the docking mechanism in transition from vertical movement to horizontal movement.

These drive mechanisms are connected with and powered by the chains or flexible drive belts 37, 38. The drive mechanisms 40, 41 engage the lift portion 19 of the dock to raise and lower the chair relative to the arms 17 when the chair is in contact with the lift portion. Drive mechanisms 140 and 141 also operate in reverse to displace the chair from the seating position in the vehicle to the exterior ends of the arms 17. The drive mechanisms may be in the nature of gears, sprocket wheels or pinions and the lift portion 19 in the nature of channeled or slotted tracks or racks so that as the drive mechanisms are turned by the flexible belts or chains, the lift portion is translated or moved in response. The ends of the flexible drive lines are connected to stub shafts which extend from the arms 17 as illustrated by stub shaft 105 in FIG. 2. Idler pulleys 106 are located between the stub shafts and the drives 35 and 36. The idler pulleys 106 are attached to springs 107 which move the idler pulley as the flexible drive shortens to take up slack. The springs 107 are attached to the exterior ends of the arms. The arms 17 have a channel members 50 forming the upper margin, shown in FIGS. 3–5. The channel members have a vertical web 52 with an upper flange 51 and a lower flange 53 extending outwardly on the same side and parallel to each other. The channel members 50 have a downwardly opening section 51 forming the exterior ends of the arms. Support wheels mounted on the lifting portion roll in the channel members in contact with flanges 53 during movement of the lift portion 19. The brackets 60 are movably mounted on the exterior ends of the arms 17. The brackets have a horizontal edge with four support wheels that travel in the horizontal portion of the channels 50. One set of these support wheels 61 and 62 is shown in FIGS. 3–5. These wheels operate to allow horizontal movement of the lift portion 19 and the chair 18 to translate the chair from the interior of the vehicle to the exterior and vice versa. The stops 63, one in each channel, prevent the brackets from separating from the arms 17.

The brackets 60 have a leading edge 64 that parallels the vertical members 90 of the lift portion 19. The leading edge of each bracket has two sets of wheels 65, 66 and 67, 68 that contact opposite sides of a flange 92 on the vertical member 90. The brackets allow the lift portion 19 to move vertically and prevents the lift portion from tipping as the chair is hoisted off the ground.

The lift portion 19, as shown in FIGS. 3–5, is a L-shaped frame with vertical members 90 and horizontal members 91. There are two such L-shaped frames spaced apart approximately the same distance as the arms 17. The horizontal members 91 carry guide wheels 93 connected to each member by a bracket 94. As the lift portion is moving vertically, the guide wheels engage the channel portions 54, as shown in FIGS. 4 and 5. As the guide wheels approach the horizontal channels, they engage wheels 95 which smooth the transition from vertical movement to horizontal movement of the lift portion 19. The wheels 95 are rotatably mounted on the exterior ends of the arms 17.

Figure 6:
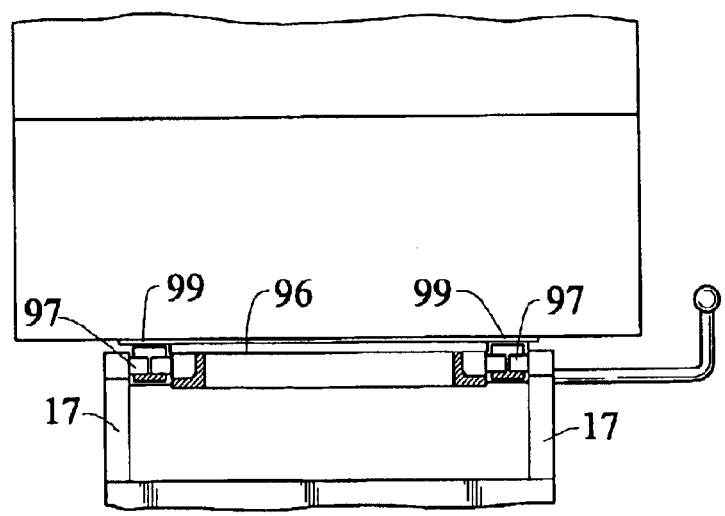
FIG. 6 is a rear view, partially in section, of the chair locking system.
Figure 7:
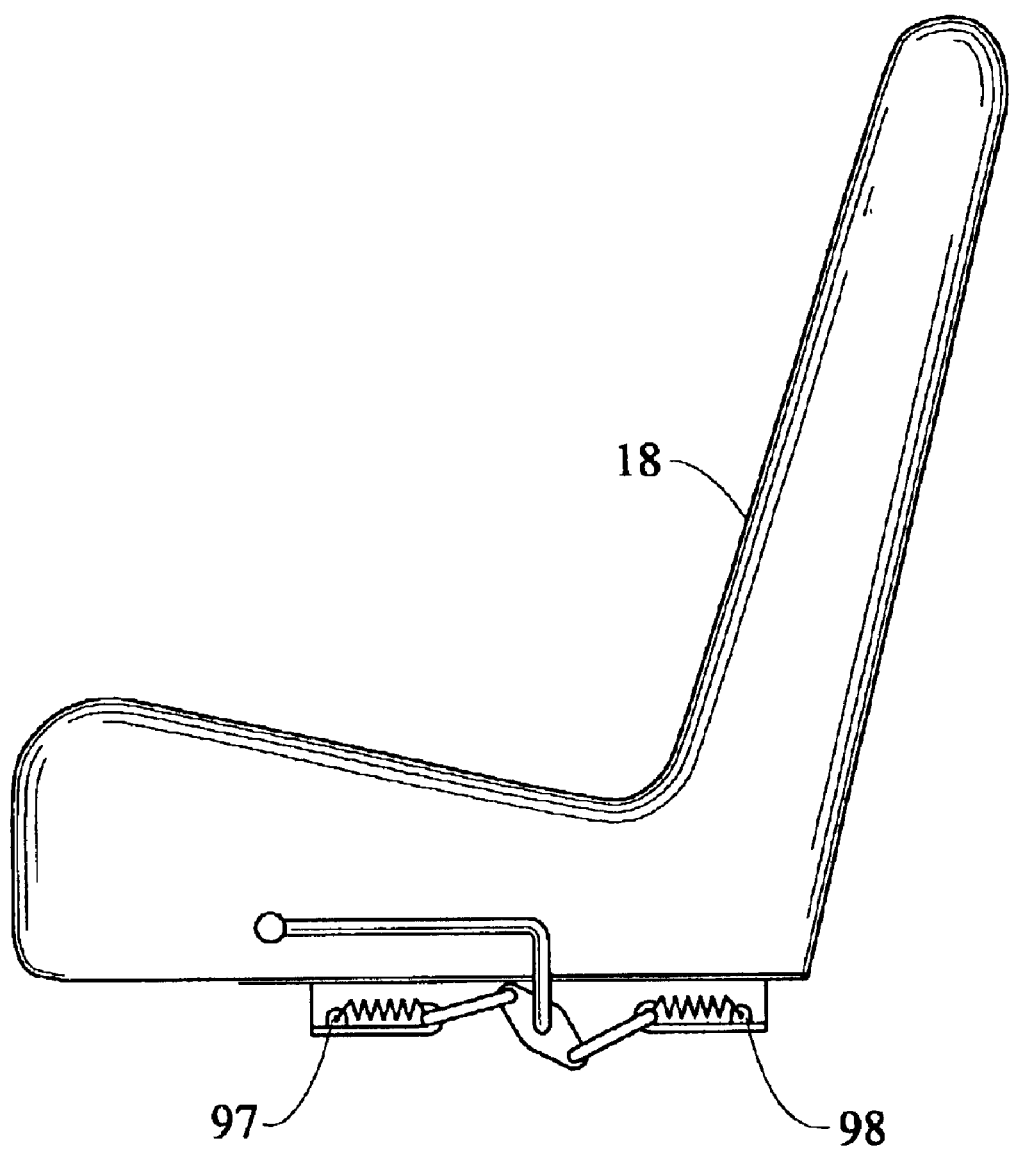
FIG. 7 is a side view of the locking system for the chair and docking mechanism.
Figure 8:
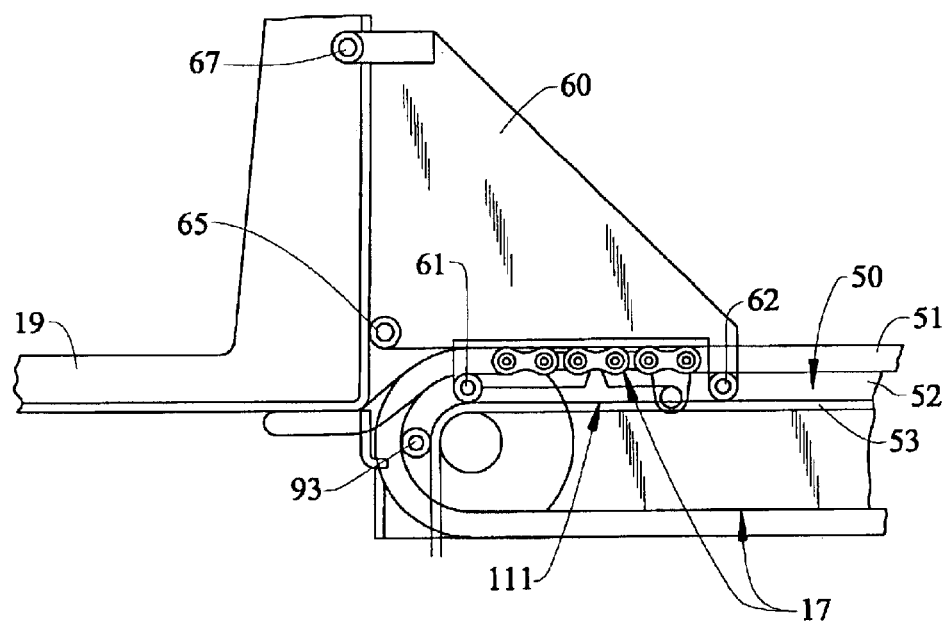
FIG. 8 is a side view partially in section of a modification of the conveyor system.

As the wheeled chair engages the lift portion, the bottom surface 96 of the seat of the chair is above the arms 17 and the rear surface of the back of the seat contacts the vertical members of the lift portion 19, as shown in FIG. 6. The arms 17 have inwardly extending pins 97, 98 which are disposed under brackets 99, as shown in FIG. 7. There is a duplicate set of pins on the other arm 17. These pins are captured by the box brackets 99 as the chair is lowered to be supported by the lift portion 19. Movement of the handle 108, as shown in FIG. 8, will close the bottom of the box brackets 99 with a movable slide 109. The movable slide 109 is connected to the handle 108 by a spring loaded lever mechanism 110. By securing the chair to the lift portion with laterally spaced pins, tipping of the chair relative to the lift portion is prevented upon lifting the chair out of ground contact.

In a loading scenario, as shown in FIG. 1, the chair will initially be backed onto the lift portion using the powered wheels and steering mechanism. Once in place, the chair will be lowered to contact the horizontal members of the lift portion. The handle will be operated to lock the pins in place securing the chair to the lift portion. The chair is lifted off the ground as the active conveyor mechanism 32 begins to move. The conveyor mechanism initially exerts a lifting force on the lifting portion. When the chair has reached the limit of vertical movement, the wheels may be retracted. Of course, this may be done simultaneously with the movement of the chair.

With the chair at the appropriate level in relation to the dock, the continued movement of the conveyor mechanism translates the chair horizontally along the arms 17 and into the vehicle until the outer drive mechanisms are near the forward edge of the seat. The turntable is then rotated to place the chair in the normal vehicle seating arrangement.

Figure 9:
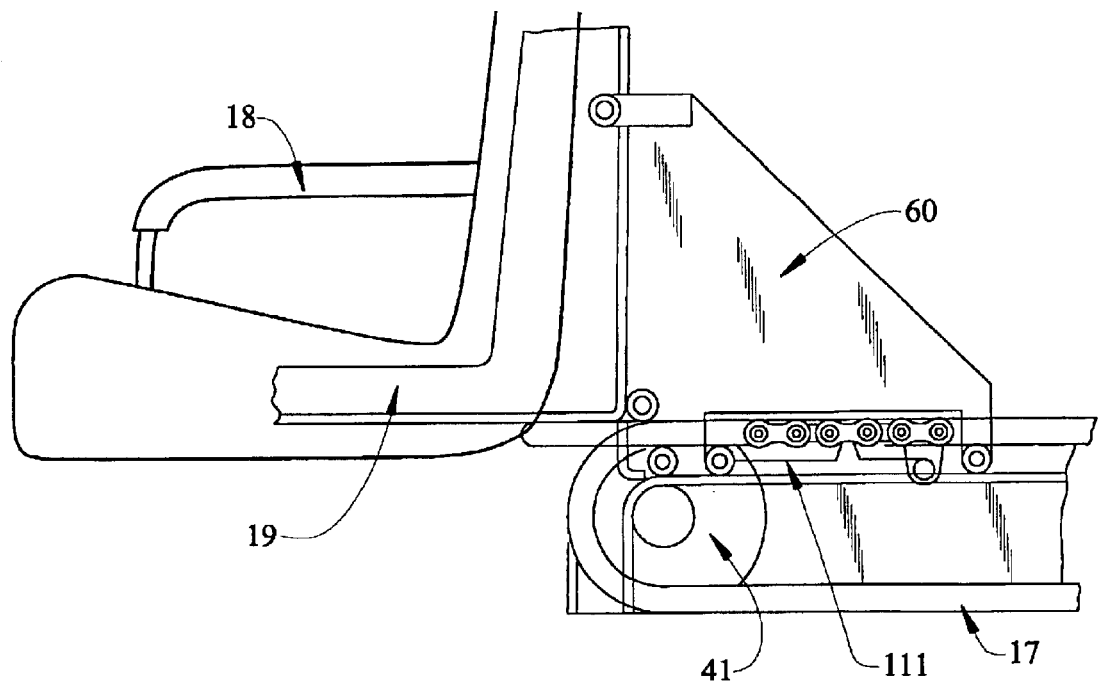
FIG. 9 is a side view partially in section of the conveyor system.

With regard to FIGS. 8–9, the lift porting 19 may be horizontally translated by a stopper 111 located on the inside of the arms 17 to engage the flexible conveyor system 32. As the lift portion 19 reaches the limit of vertical travel, the stopper is moved into engagement with the drive by the bracket 60 The stopper provides a positive connection between the lift portion and the conveyor for horizontal movement in both directions.

It is to be understood that while we have illustrated and described certain forms of my invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

We claim:

1. A combination chair and dock system for installation in a motor vehicle comprising a dock and a removable chair, said chair having a frame supporting a seat and a back, said dock having a lifting portion with horizontal members and vertical members extending approximately normal to said horizontal members, said back having a rear surface extending along said vertical members from said seat toward a top edge, said seat having a bottom surface extending along said horizontal members from said back to a forward edge, a flexible drive mechanism connected to said lifting portion for vertical movement and horizontal movement, said dock adapted to be mounted in the motor vehicle, said dock carrying horizontal arms, said arms having an interior end and an exterior end, said flexible drive mechanism connected to said arms, said lifting portion movably connected to said arms whereby said flexible drive mechanism moves said removable chair relative to said arms, said removable chair having a left and a right side panel, each of said left and right side panel extending from said bottom surface vertically along said back and terminating in a left and right horizontally disposed arm rest, each of said left and right side panel having a rear section connected to said frame at said back and a front section connected to said frame at said forward edge, a left set of wheels connected to said left side panel, one of said left set of wheels at said front section and the another of said left set of wheels at said rear section, and a right set of wheels connected to said right side panel, one of said right set of wheels at said front section and another of said set of wheels at said rear section whereby said chair can roll across a support surface, a plurality of jacks, each of said plurality of jacks connected between said left and right side panels and each of said left and right sets of wheels whereby said left and right sets of wheels can be retracted toward said bottom surface or extended away from said bottom surface, a set of controls mounted in said chair and operatively connected to a motor, said motor connected to said dock whereby an occupant of said chair can operate said dock when said docking mechanism is docked with said chair.

2. A combination chair and lift system of claim 1 further comprising said plurality of jacks operatively connected to a second power assist and said set of controls whereby said jacks can be retracted and extended by an occupant of said chair.

3. A combination chair and lift system of claim 1 further comprising an energy source mounted on said frame, a motor mounted on said frame, said motor operatively connected to said energy source and said left and right sets of wheels, a steering mechanism mounted on said chair and operatively connected to said left and right set of wheels whereby said motor can move said chair independently of said docking mechanism.

4. A combination chair and dock system of claim 3 further comprising each of said plurality of jacks operatively connected to said motor whereby said chair can be adjusted to engage lifting portion.

5. A combination chair and dock system of claim 1 further comprising said back and said seat of said chair being relatively movable to change the angle between said seat and said back.

6. A combination chair and dock system of claim 1 further comprising a foot rest pivotally connected to said forward edge of said seat.

7. A combination chair and dock system of claim 1 further comprising a floor plate adapted to be connected to the floor pan of a motor vehicle, a turn table rotatably connected to said floor plate, said arms fixed on said turn table to horizontally move said chair in an arc of approximately 90 degrees.

8. A combination chair and dock system for installation in a motor vehicle comprising a dock and a removable chair, said chair having a frame supporting a seat and a back, said dock having a lifting portion with horizontal members and vertical members extending approximately normal to said horizontal members, said back having a rear surface extending along said vertical members from said seat toward a top edge, said seat having a bottom surface extending along said horizontal members from said back to a forward edge, a flexible drive mechanism connected to said lifting portion for vertical movement and horizontal movement, said dock adapted to be mounted in the motor vehicle, said dock carrying horizontal arms, said arms having an interior end and an exterior end, said flexible drive mechanism connected to said arms, said lifting portion movably connected to said arms, a bracket mounted on each of said arms at said exterior end, each said bracket having an a bottom edge and a leading edge, a first set of wheels connected to said leading edge, a second set of wheels connected to said bottom edge, an elongated channel structure extending along said arms, said channel structure adapted to movably engage said first set and said second set of wheels and stabilize said chair and prevent tipping whereby said flexible drive mechanism moves said removable chair relative to said arms.

9. A combination chair and dock system of claim 8 further comprising a left and a right side panel, each of said left and right side panel extending from said bottom surface vertically along said back and terminating in a left and right horizontally disposed arm rest, each of said left and right side panel having a rear section connected to said frame at said back and a front section connected to said frame at said forward edge, a left set of wheels connected to said left side panel, one of said left set of wheels at said front section and the another of said left set of wheels at said rear section, and a right set of wheels connected to said right side panel, one of said right set of wheels at said front section and another of said set of wheels at said rear section whereby said chair can roll across a support surface.

10. A combination chair arid dock system of claim 9 further comprising a plurality of jacks each of said plurality of jacks connected between said left and right side panels and each of said left and right sets of wheels whereby said left and right sets of wheels can be retracted toward said bottom surface or extended away from said bottom surface.

11. A combination chair and dock system of claim 10 further comprising an energy source mounted on said frame, a motor mounted on said frame, said motor operatively connected to said energy source and said left and right sets of wheels, a steering mechanism mounted on said chair and operatively connected to said left and right set of wheels whereby said motor can move said chair independently of said lift mechanism.

12. A combination chair and dock system of claim 11 further comprising each of said plurality of jacks operatively connected to said motor whereby said chair can be adjusted to engage said arms.

* * * * *